United States Patent
Hsu (10) Patent No.: US 7,889,521 B2
(45) Date of Patent: Feb. 15, 2011

(54) THREE-PIN INTEGRATED SYNCHRONOUS RECTIFIER AND A FLYBACK SYNCHRONOUS RECTIFYING CIRCUIT

(75) Inventor: Ta-Ching Hsu, Sijhih (TW)

(73) Assignee: Niko Semiconductor Co., Ltd., Taipei (TW)

( * ) Notice: Subject to any disclaimer, the term of this patent is extended or adjusted under 35 U.S.C. 154(b) by 176 days.

(21) Appl. No.: 12/073,581

(22) Filed: Mar. 7, 2008

(65) Prior Publication Data
US 2009/0109711 A1    Apr. 30, 2009

(30) Foreign Application Priority Data
Oct. 26, 2007   (TW) ............................... 96140227 A (51) Int. Cl.
*H02M 3/335*   (2006.01)
(52) U.S. Cl. .................. 363/21.14; 363/21.15
(58) Field of Classification Search ............. 363/21.12, 363/21.14, 21.06, 44, 81, 84, 125, 97, 21.15; 323/282–284, 273–275, 288
See application file for complete search history.

(56) References Cited

U.S. PATENT DOCUMENTS

| | | | | |
|---|---|---|---|---|
| 6,069,804 A * | 5/2000 | Ingman et al. | ........... | 363/21.14 |
| 6,778,417 B2 * | 8/2004 | Itakura et al. | .................. | 363/97 |
| 6,813,166 B1 * | 11/2004 | Chang et al. | ............. | 363/21.14 |
| 6,961,253 B1 * | 11/2005 | Cohen | .......................... | 363/89 |
| 6,995,991 B1 * | 2/2006 | Yang et al. | ................ | 363/21.14 |
| 7,408,796 B2 * | 8/2008 | Soldano | ....................... | 363/127 |

* cited by examiner

*Primary Examiner*—Adolf Berhane
*Assistant Examiner*—Emily Pham
(74) *Attorney, Agent, or Firm*—Rosenberg, Klein & Lee (57) ABSTRACT

A three-pin integrated synchronous rectifier is the synchronous rectifier chip where the quantity of connection pins is the smallest possible quantity. The three-pin integrated synchronous rectifier uses a control pin to receive a control signal used as a power bias voltage and a synchronous pulse to make the synchronous rectifier chip operate normally. The control signal is obtained from the output pin of an auxiliary winding via a diode. The other pins are respectively the drain pin and the source pin of an internal power transistor and are connected with the output winding and the voltage output terminal for transmitting the power of the transformer to supply current for the loading.

14 Claims, 6 Drawing Sheets

THREE-PIN INTEGRATED SYNCHRONOUS RECTIFIER AND A FLYBACK SYNCHRONOUS RECTIFYING CIRCUIT

BACKGROUND OF THE INVENTION

1. Field of the Invention

The present invention relates to a three-pin integrated synchronous rectifier and a flyback synchronous rectifying circuit that utilize a control pin to provide a control signal, whereby the control signal is used as a power bias voltage and a synchronizing signal, and a power transistor is built in a single package so that the connection pins are reduced. The structure is simplified so that the required area on the print circuit board is reduced and the cost of the power supply is decreased.

2. Description of the Related Art

The switching power supply traditionally is implemented by a diode rectifier. In order to meet the requirements, such as environmental protection, cooling and power efficiency, the diode rectifier gradually is replaced by the synchronous rectifier. However, the synchronous rectifying circuit of the prior art has a structure in which the control circuit and the power transistor are separated. In practical application, the less is the number of connection pins, the lower are the costs of the circuit. Therefore, the cost of the synchronous rectifier with three pins will be the lowest. One pin is controlled by power bias voltage and a synchronous pulse. The other two pins are the drain terminal and the source terminal of the power transistor. Due to the package limitation, the synchronous rectifying circuit of the prior art is implemented by an expensive synchronous rectifying control method that includes an eight pin synchronous rectifying controller, some discrete elements and an external power transistor.

Figure 1:
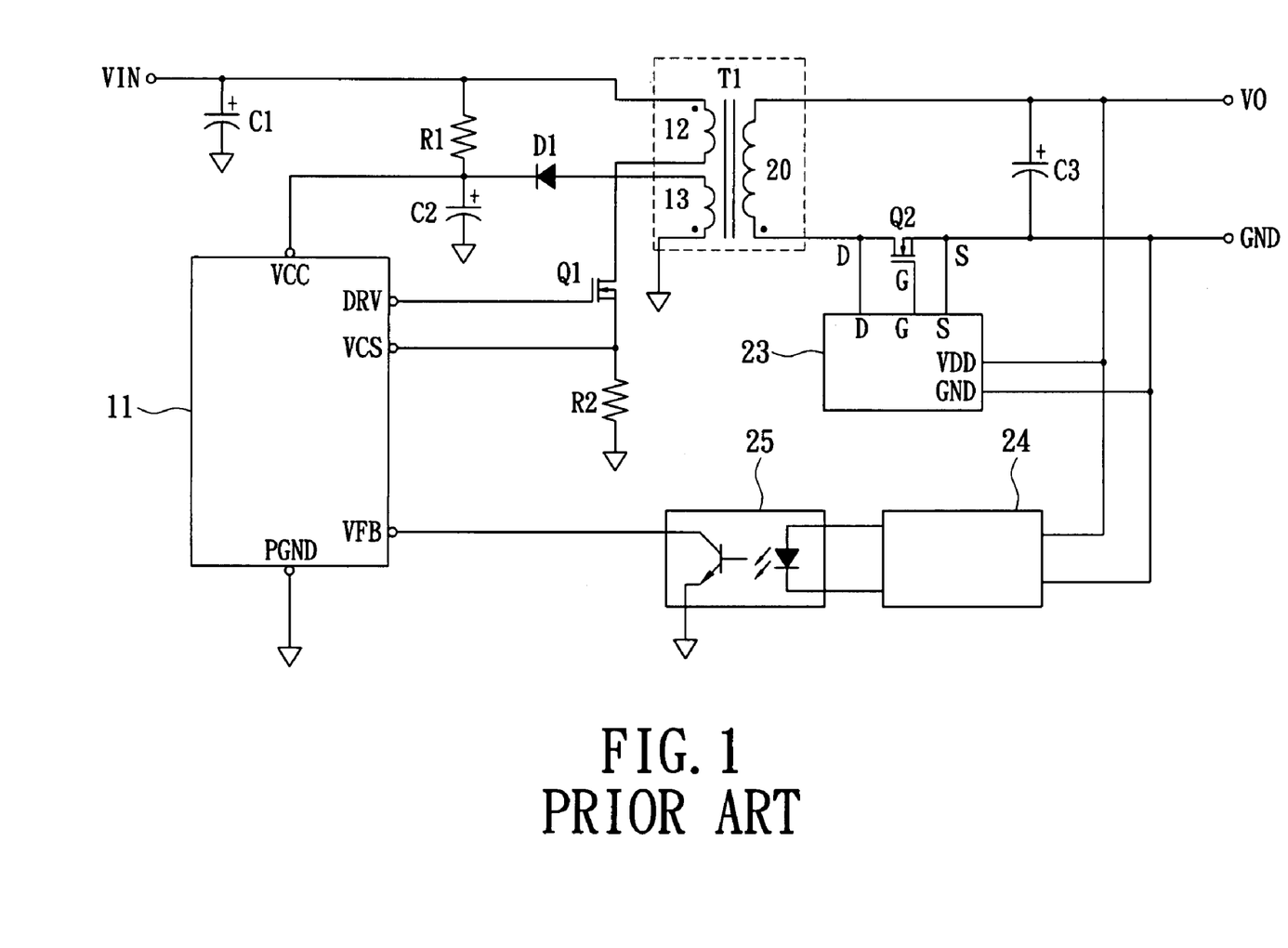
FIG. 1 is a circuit diagram of the synchronous rectifying circuit of the prior art.

FIG. 1 shows a synchronous rectifying circuit of the prior art. The synchronous rectifying circuit includes a DC power VIN, an input filtering capacitor C1, a turn-on resistor R1, a bias voltage power filtering capacitor C2, a primary pulse width modulation (PWM) controller 11, a transformer T1 having a primary main winding 12, an primary auxiliary winding 13 and a secondary output winding 20, a rectifying diode D1 providing a DC bias voltage power VCC, a primary side power transistor Q1 for controlling the power transmission of the transformer, a primary current detection resistor R2 for limiting the maximum output power, a secondary side power transistor Q1 for rectifying the secondary side, a synchronous rectifying control circuit 23 for controlling the turn-on and turn-off of the secondary side power transistor Q2, a feedback error-compensation amplifier 24, and a photo coupler 25. When the power is turned on, the DC power VIN charges the bias voltage power filtering capacitor C2 via the turn-on resistor R1. When the charged voltage reaches the turn-on voltage of the primary PWM controller 11, the primary PWM controller 11 outputs a turn-on signal to control the primary side power transistor Q1 to be operated so that the current flows into the primary main winding 12. When transformer T1 begins to operate, the bias voltage power is gradually provided by the rectifying diode D1 and the bias voltage power filtering capacitor C2, via the primary auxiliary winding 13. A primary side voltage feedback signal that is representative of the secondary side output voltage VO is transmitted to the primary side via the feedback error-compensation amplifier 24 and the photo coupler 25 and is inputted to the primary PWM controller 11. The synchronous rectifying control circuit 23 is supplied with power by output voltage VO, via the bias voltage power VDD and has two detection pins D, S respectively connected with a drain and a source of the secondary side power transistor Q2, and an output pin G connected with the gate of the secondary side power transistor Q2 to control the secondary side power transistor Q2 to be exactly turn-on or turn-off.

The synchronous rectifying circuit of the prior art needs to be packaged by at least four pin package. The low cost three pin industry standard packages, such as TO-220, DPAK, and TO-3P, are excluded. Furthermore, the power bias voltage VDD of the synchronous rectifying circuit of the prior art has to be a DC power. If the output voltage VO of the power supply is too high, the voltage needs to be reduced by a linear regulator. If the output voltage of the power supply is too low, a secondary auxiliary winding, rectifying and filtering elements and a linear regulator are required. Costs increase and the power efficiency decreases.

SUMMARY OF THE INVENTION

One particular aspect of the present invention is to provide a three-pin integrated synchronous rectifier. In one embodiment, the three-pin integrated synchronous rectifier has a control pin for receiving a control signal to be a power bias voltage and synchronous pulse, and two pins respectively being the drain connection pin and the source connection pin of the internal power transistor that are connected between the output winding and the output terminal for transmitting the power of the transformer to provide the required current to the loading.

The characteristic of the present invention is that the quantity of the connection pins of the package and the external components is the least. The dimension of the print circuit board is reduced, and the costs are reduced.

The three-pin integrated synchronous rectifier has a first electric connection point, a second electric connection point and a third electric connection point. The three-pin integrated synchronous rectifier includes a power transistor, and a synchronous rectifying control circuit. The power transistor has a first output/input terminal, a second output/input terminal and a control terminal. The first output/input terminal is coupled with the first electric connection point. The second output/input terminal is coupled with the second electric connection point. The synchronous rectifying control circuit is used for controlling the electric status of the power transistor, and includes an input control terminal, two detection terminals, and an output terminal. The input control terminal is coupled with the third electric connection point. The two detection terminals respectively are coupled with the first output/input terminal and the second output/input terminal of the power transistor. The output terminal is coupled with the control terminal of the power transistor. When the synchronous rectifying control circuit receives a synchronous signal at the input control terminal, the synchronous rectifying control circuit turns the power transistor on. When the synchronous rectifying control circuit detects that a current flowing through the power transistor is smaller than a pre-determined current by the two detection terminals, the synchronous rectifying control circuit turns the power transistor off.

The present invention also provides a flyback synchronous rectifying circuit. The flyback synchronous rectifying circuit includes a flyback converter, an output capacitor, a three-pin integrated synchronous rectifier, an output detection unit, an electric isolation unit, and a primary PWM controller. The flyback converter includes a first power transistor and a transformer having a primary side and a secondary side. The first power transistor is coupled with the primary side. The output capacitor is coupled with the secondary side of the transformer. The three-pin integrated synchronous rectifier has a first electric connection point, a second electric connection point and a third electric connection point. The first electric connection point and the second electric connection point respectively are coupled with the secondary side of the transformer and the output capacitor. The third electric connection point is used for receiving a synchronous signal. The output detection unit is coupled with the secondary side of the transformer for detecting the electric status of the secondary side to generate an output detection signal. The electric isolation unit is coupled with the output detection unit for outputting the output detection signal with electric isolation. The primary PWM controller is coupled with the flyback converter and the electric isolation unit for turning on or turning off the first power transistor according to the output detection signal. When the three-pin integrated synchronous rectifier receives the synchronous signal, the three-pin integrated synchronous rectifier is changed to the turn-on status for conducting an output current. When the output current is smaller than a pre-determined value, the three-pin integrated synchronous rectifier is changed to the turn-off status.

For further understanding of the invention, reference is made to the following detailed description illustrating the embodiments and examples of the invention. The description is only for illustrating the invention and is not intended to limit of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 2:
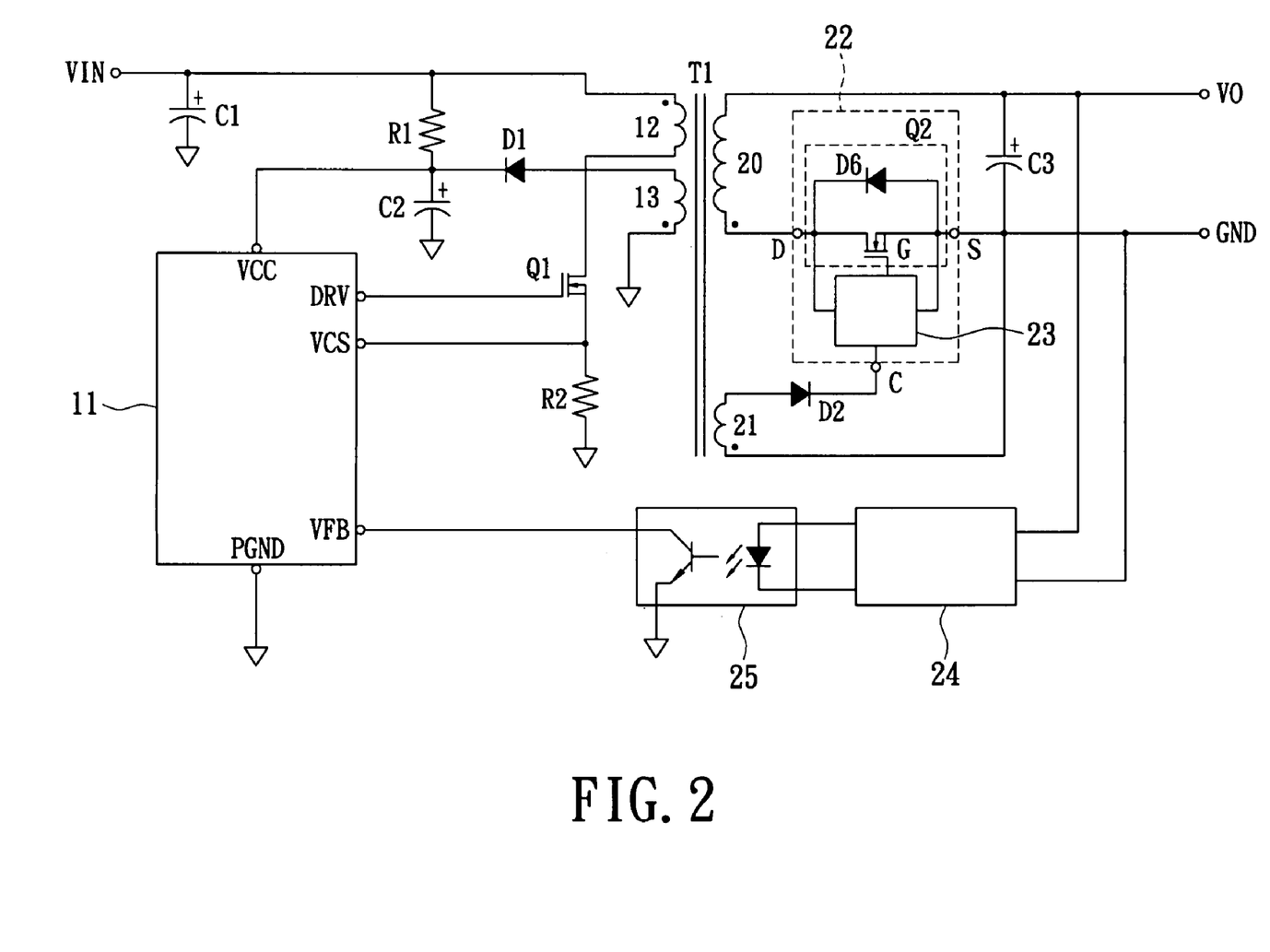
FIG. 2 is a circuit diagram of the three-pin integrated synchronous rectifier of the present invention applied to the flyback synchronous rectifying circuit.

Reference is made to FIG. 2, which shows a circuit diagram of the three-pin integrated synchronous rectifier of the present invention applied to the flyback synchronous rectifying circuit. The circuit includes a DC power VIN, an input filtering capacitor C1, a turn-on resistor R1, a bias voltage power filtering capacitor C2, an output filtering capacitor C3, a primary PWM controller 11, a transformer T1 having a primary main winding 12, an primary auxiliary winding 13, a secondary output winding 20 and a secondary auxiliary winding 21, a rectifying diode D1 for providing a DC bias voltage power VCC, a primary side power transistor Q1 for controlling the power transmission of the transformer T1, a three-pin integrated synchronous rectifier 22, an output detection unit 24 (a feedback error-compensation amplifier in this embodiment), and an electrical isolation unit 25 (a photo coupler in this embodiment). When the power is turned on, the DC power VIN charges the bias voltage power filtering capacitor C2 via the turn-on resistor R1. When the charged voltage reaches the turn-on voltage of the primary PWM controller 11, the primary PWM controller 11 outputs a turn-on signal to control the primary side power transistor Q1 to be operated so that the current flows into the primary main winding 12. Therefore, the transformer T1 operates and the bias voltage power VCC is gradually provided by the rectifying diode D1 and the bias voltage power filtering capacitor C2 via the primary auxiliary winding 13. The primary side voltage feedback signal that is representative of the secondary side output voltage VO is transmitted to the primary side via the feedback error-compensation amplifier 24 and the photo coupler 25 and is inputted to the primary PWM controller 11. The three-pin integrated synchronous rectifier 22 includes a power transistor Q2 and a synchronous rectifying control circuit 23. The synchronous rectifying control circuit 23 includes an input control terminal C, a detection terminal D, a detection terminal S and an output terminal G. The input control terminal C is connected with the secondary auxiliary winding 21 via the rectifying diode D2 and obtains the positive voltage pulse to provide the power bias voltage and the synchronous signal. The D detection terminal and the S detection terminal are respectively connected with the drain and the source of the power transistor Q2, and the output terminal G is connected with the gate of the power transistor Q2. The first pin of the three-pin integrated synchronous rectifier 22 is coupled with the source of the power transistor Q2, the second pin of the three-pin integrated synchronous rectifier 22 is coupled with the drain of the power transistor Q2, and the third pin of the three-pin integrated synchronous rectifier 22 is coupled with the input control pin C of the synchronous rectifying control circuit 23.

Figure 3:
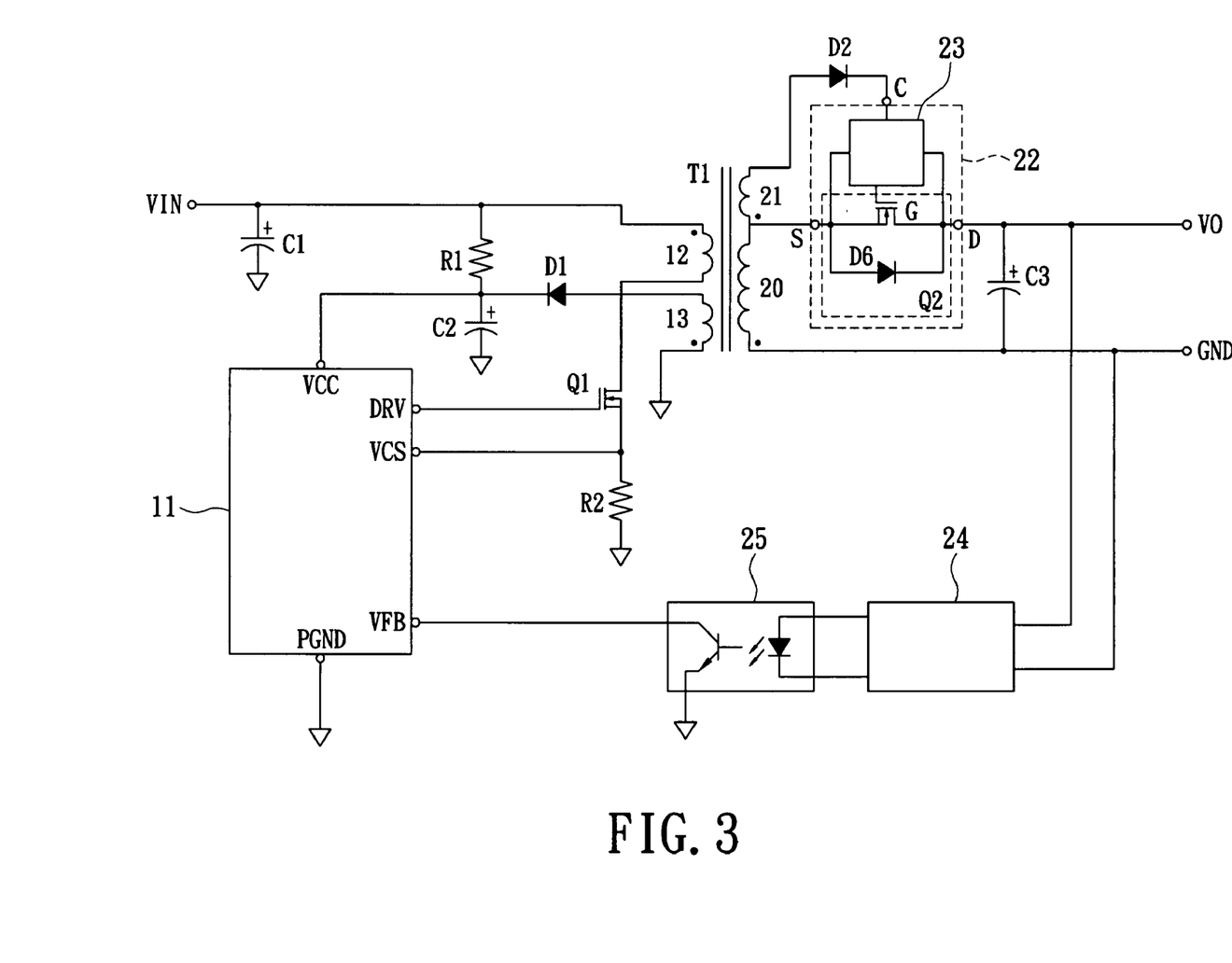
FIG. 3 is a circuit diagram of the three-pin integrated synchronous rectifier of the second embodiment of the present invention applied to the flyback synchronous rectifying circuit.

FIG. 3 shows a circuit diagram of the three-pin integrated synchronous rectifier of the second embodiment of the present invention applied to the flyback synchronous rectifying circuit. The secondary auxiliary winding 21 and the three-pin integrated synchronous rectifier 22 are located at the output terminal of the secondary output winding 20. The three-pin integrated synchronous rectifier 22 still can operate normally. The reference voltage of the synchronous rectifying control circuit 23 is the source of the power transistor Q2 that is different from the reference voltage in FIG. 2 that uses the grounding as the reference voltage. However, both the synchronous rectifying operations are the same as each other.

Figure 4:
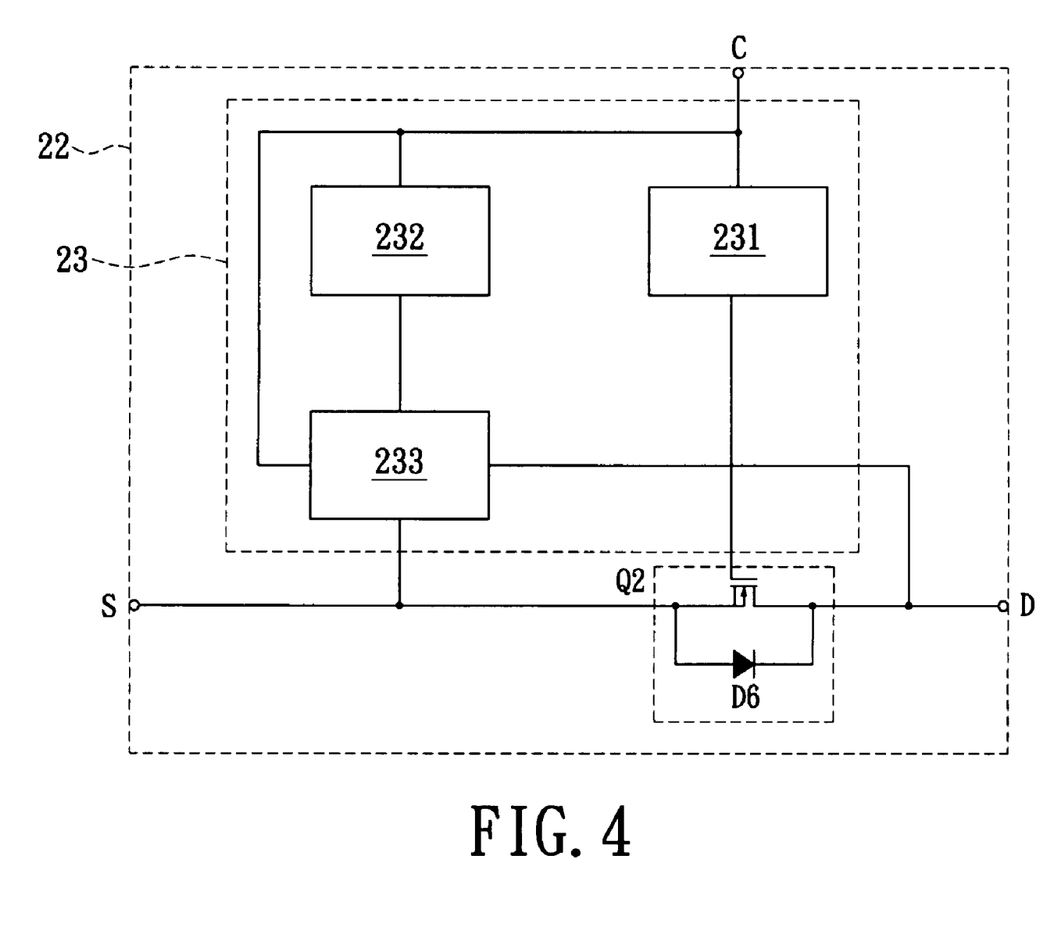
FIG. 4 is a block diagram of the synchronous rectifying control circuit of the present invention.

FIG. 4 shows a block diagram of the synchronous rectifying control circuit of the present invention. The synchronous rectifying control circuit includes a driver 231, a delay circuit 232, a detection circuit 233, and a power transistor Q2. When the driver 231 receives a synchronous signal via the input control pin C, the power transistor Q2 is turned on, and uses the delay circuit 232 to prevent a ringing signal from generating at the input control pin C due to the polarity transition of the secondary auxiliary winding 21 and the harmonics after the power stored in the transformer T1 is fully released. The detection circuit 233 detects the current flowing through the power transistor Q2. When the current flowing through the power transistor Q2 approaches zero, the detection circuit 233 outputs a signal to the delay circuit 232, and the delay circuit 232 causes the output of the driver 231 to change to a low level to turn off the power transistor Q2 to prevent the power stored in the output filtering capacitor C3 from flowing back to the transformer T1. When the primary side power transistor Q1 is changed to the turn-on status and the polarity of the secondary auxiliary winding 21 is changed to the negative polarity, the input control pin C stops supplying power bias voltage and the three-pin integrated synchronous rectifier 22 gradually recovers to the initial status. When the polarity of the secondary auxiliary winding 21 is changed to the positive polarity again, the input control pin C obtains the positive polarity voltage and supplies power to the driver 231 to make the power transistor Q2 is changed to the turn-on status again. The above procedures are repeated to achieve the synchronous rectifying operation.

Figure 5:
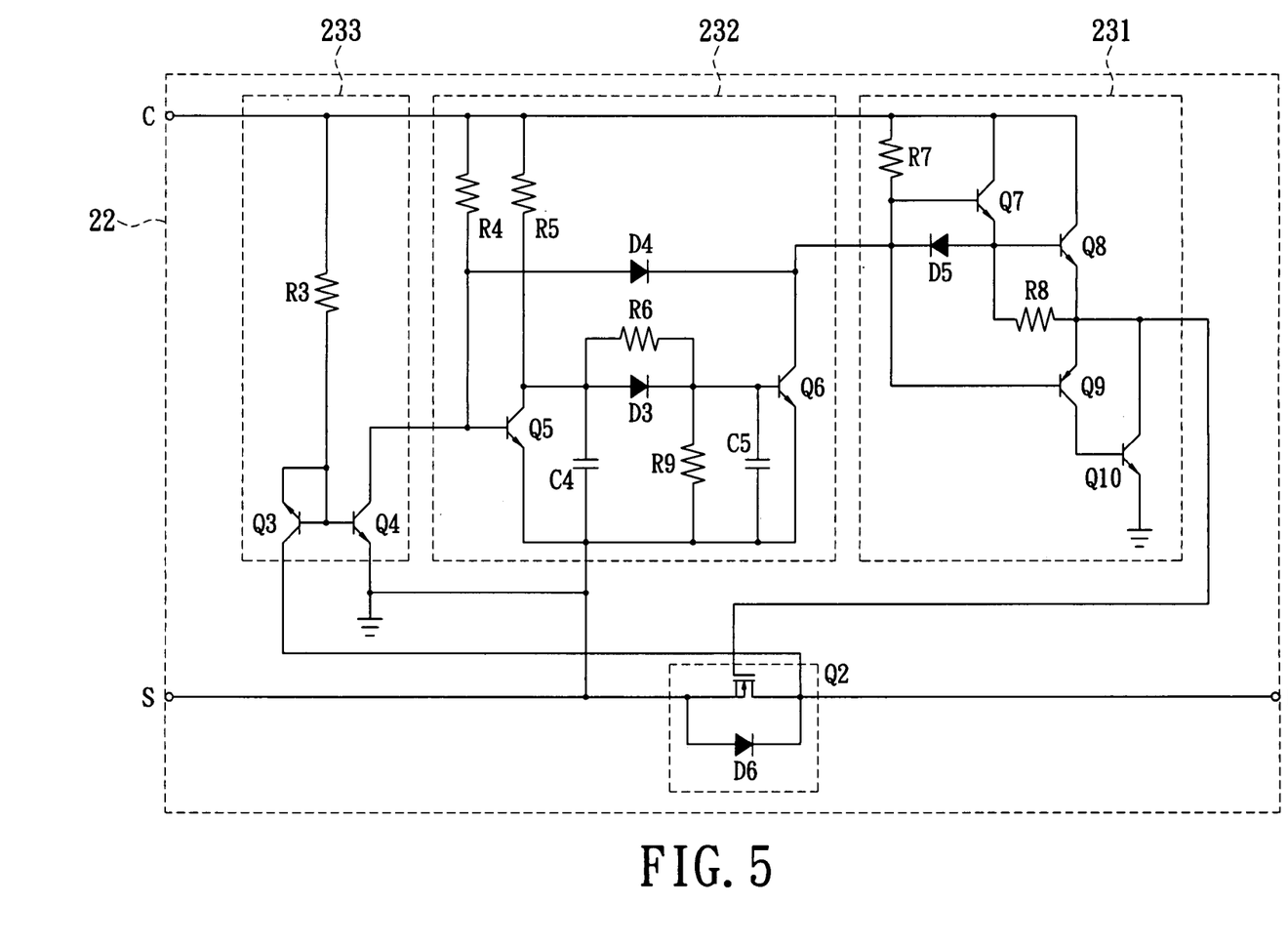
FIG. 5 is a circuit diagram of the three-pin integrated synchronous rectifier of the present invention.

FIG. 5 shows a circuit diagram of the three-pin integrated synchronous rectifier of the present invention. The driver 231 includes four transistors Q7, Q8, Q9, Q10, a diode D5, and resistors R7, R8. The delaying circuit 232 could be a debouncing circuit, and includes two transistors Q5, Q6, two diodes D3, D4, resistors R4, R5, R6, R9 and capacitors C4, C5. The detection circuit 233 includes two transistors Q3, Q4 and resistor R3. The bases of the transistors Q3, Q4 are connected with each other. The collector of the transistor Q3 and the emitter of the transistor Q4 respectively are coupled with the D detection pin and the S detection pin. The base and the emitter of the transistor Q3 are connected together and are coupled with the input control pin C via the resistor R3. The collector of the transistor Q4 is coupled to the delay circuit 232. Because the inverse voltage between the base and the collector of the bipolar junction transistor is quite larger than the inverse voltage between the base and the emitter thereof, the inverse voltage of the transistor Q3 is increased due to the base and the emitter of the transistor Q3 are connected together.

Figure 6:
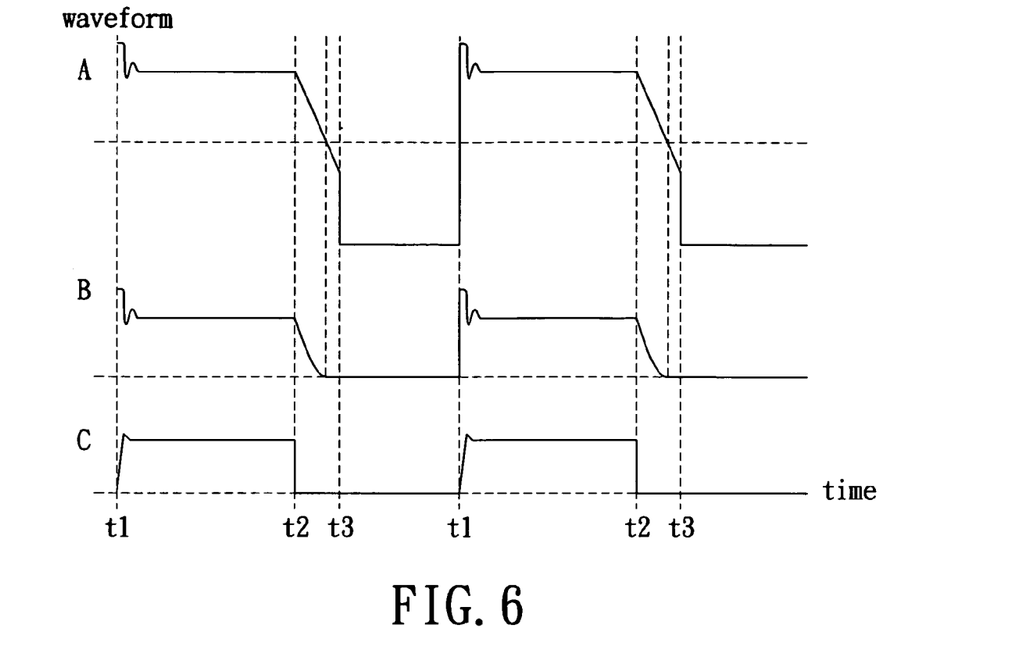
FIG. 6 is a waveform diagram of the operation of the three-pin integrated synchronous rectifier of the present invention.

FIG. 6 and FIG. 2 (or FIG. 3) are used for illustrated the operation of the three-pin integrated synchronous rectifier 22. Waveform A is the voltage waveform of two terminals of the secondary auxiliary winding 21 under heavy loading. Waveform B is the waveform of the control pin C of the three-pin integrated synchronous rectifier 22. Waveform C is the waveform of the gate of the transistor Q2 of the three-pin integrated synchronous rectifier 22. At time t1, the primary side power transistor Q1 is changed to a turn-off status, and the power stored in the transformer T1 is released to the secondary side, as the waveform A in FIG. 6. At this time, the voltage of the secondary auxiliary winding 21 is changed to a positive voltage and the ring occurs due to the status transition, as the waveform B in FIG. 6. Moreover, because the voltage at the input control pin C rises, the transistors Q7, Q8 in the Darlington circuit in the driver 231 are transferred to be in the turn-on status, and the transistors Q9, Q10 are transferred to be in the turn-off status so that the voltage of the gate of the transistor Q2 is risen and in the turn-on status, as the waveform C in FIG. 6. Before the voltage of the gate of the transistor Q2 is not raised enough to make the transistor Q2 be in the turn-on status, the current of the secondary output winding 20 flows through the body diode D6 of the power transistor Q2. When the power transistor Q2 is in the turn-on status, the current flows through the transistor Q2. Therefore, the current of the secondary output winding 20 makes the voltage difference between the source S and the drain D of the power transistor Q2 be equal to the forward bias voltage of the diode D6 (before the power transistor Q2 is in the turn-on status), or equal to I*RDSon (after the power transistor Q2 is in the turn-on status), whereby I is the current of the secondary output winding 20, and RDSon is the turn-on impedance of the power transistor Q2). In the detection circuit 233, the transistor Q3 is transferred to be in the turn-on status when the voltage at the input control pin C rises. Due to the voltage difference of the source S and the drain D of the power transistor Q2, the voltage of the emitter of the transistor Q4 is higher than the voltage of the collector of the transistor Q3 so that the transistor Q4 of the detection circuit 233 is in the turn-off status. When the transistor Q4 is in the turn-off status, the transistors Q5, Q6 of the delay circuit 232 are respectively in the turn-on status and the turn-off status. The secondary auxiliary winding 21 may produce a ringing symptom due to voltage transition so that the detection circuit 233 or the driver 231 may abnormally operate. By utilizing the capacitors C4, C5 of the delay circuit 232 to absorb the power of the ringing, the driver 231 can normally operates.

When the power stored in the transformer T1 is released, the current flowing through the power transistor Q2 also is decreased so that the voltage difference between the source S and the drain D of the power transistor Q2 descends to a pre-determined value. At this moment, the transistor Q4 is transferred to be in the turn-on status. The transistor Q5 of the delay circuit 232 is transferred to be in the turn-off status, and the input control pin C charges the capacitors C4, C5 via the resistor R5 and the diode D3. The diode D3 is used for speeding up the charging process for the capacitor C5. After a pre-determined period passes, the transistor Q5 is still in the turn-off status to be charged enough to turn on the transistor Q6, the transistor Q6 is turned on at time t2 and so the transistors Q9, Q10 of the driver 231 are also turned on. Therefore, the voltage of the gate of the power transistor Q2 descends rapidly and the power transistor Q2 is transferred to be in the turn-off status. When the transistors Q7, Q8 of the driver 231 are transferred to the turn-off status, the electric charge stored in the parasitic capacitor is rapidly released via the diode D5 so that the transistors Q7, Q8 are rapidly transferred to the turn-off status. Next, the voltage of the two terminals of the secondary auxiliary winding 21 begins to descend. At time t3, the primary side power transistor Q1 is transferred to be in the turn-on status, the transformer T1 changes its status again, and the DC power source VIN delivers power to the transformer T1. The electric charge stored in the capacitor C5 is gradually released via the resistor R9. The charge stored in the capacitor C4 is released via the resistor R6, the diode D3 and the resistor R9. The three-pin integrated synchronous rectifier 22 gradually recovers to its original status.

Figure 7:
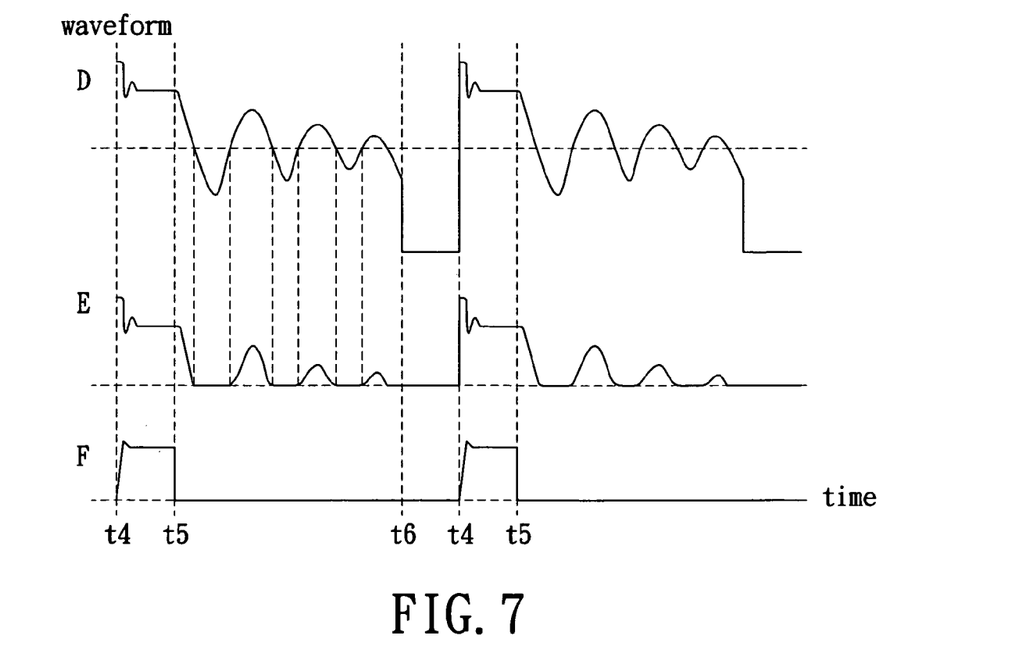
FIG. 7 is another waveform diagram of the operation of the three-pin integrated synchronous rectifier of the present invention.

Reference is made to waveforms D~F shown in FIG. 7. The waveforms D~F are respectively the waveform of the two terminals of the secondary auxiliary winding 21, the waveform of the control pin C of the three-pin integrated synchronous rectifier 22 and the waveform of the gate of the power transistor Q2 of the three-pin integrated synchronous rectifier 22 when the loading is light. At time t4, when the primary side power transistor Q1 is transferred to be in the turn-off status, the power stored in the transformer T1 is released to the secondary side, as the waveform D shown in FIG. 7. When the power stored in the transformer T1 is almost released, the detection circuit 233 detects that the current flowing through the power transistor Q2 descends below a pre-determined value and outputs a turn-off signal. When the turn-off signal is delayed a pre-determined period by the delay circuit 232 and is confirmed, the turn-off signal is transmitted to the driver 231 to pull down the voltage of the gate of the power transistor Q2 so that the power transistor Q2 is transferred to be in the turn-off status at time t5, as the waveform F shown in FIG. 7. Because the loading is light, the power stored in the transformer T1 is less than the power needed for a heavy loading. Therefore, the period between t4 and t5 is shorter than the period between t1 and t2.

During the period between the power transistor Q2 being turned off and the primary side power transistor Q1 being turned on (period between time t5 and time t6), a harmonic symptom occurs at the secondary side of the transformer T1, as waveforms D, E shown in FIG. 7. In order to prevent the synchronous rectifying control circuit 23 from abnormally operating due to the harmonic symptom, the voltage for turning on the transistor Q6 is maintained by the capacitors C4, C5. Therefore, the driver 231 keeps the voltage of the gate of the power transistor Q2 in a low level. Furthermore, if the clamp transistor Q5 is abnormally turned on due to the harmonic symptom, the capacitors C4, C5 will abnormally discharge. Therefore, the diode D4 is used for clamping the voltage of the base of the transistor Q5 so that the clamped transistor Q5 will not be turned on when the transistor Q6 is turned on. At time t6, the primary side power transistor Q1 is turned on and so the secondary auxiliary winding 21 is transferred to a negative polarity. The input control pin C stops supplying the bias power so that the three-pin integrated synchronous rectifier 22 gradually recovers to its original status. Because the loading is light, the turn-on period of the power transistor Q1 (the period between time t6 and the time t4) is shorter than the period (the period between time t3 and time t1) for a heavy loading.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A three-pin integrated synchronous rectifier, comprising:
    a first electric connection point;
    a second electric connection point;
    a third electric connection point;
    a power transistor having a first output/input terminal, a second output/input terminal and a control terminal, wherein the first output/input terminal is coupled with the first electric connection point, and the second output/input terminal is coupled with the second electric connection point; and
    a synchronous rectifying control circuit for controlling the electric status of the power transistor and having an input control terminal, two detection terminals, and an output terminal, wherein the input control terminal is coupled with the third electric connection point, the two detection terminals respectively are coupled with the first output/input terminal and the second output/input terminal of the power transistor, and the output terminal is coupled with the control terminal of the power transistor; wherein the synchronous rectifying control circuit comprises:
    (i) a detection circuit coupled with the first output/input terminal and the second output/input terminal to form the two detection terminals and used for detecting a current flowing through the power transistor, wherein the detection circuit outputs a turn-off signal when the current is smaller than the pre-determined current;
    (ii) a delay circuit coupled with the detection circuit and outputting a confirm signal when the turn-off signal lasts a first pre-determined period; and
    (iii) a driver coupled with the delay circuit and the input control terminal, wherein the driver turns the power transistor on when the driver receives a synchronous signal at the input control terminal, and the driver turns the power transistor off when the driver receives the confirm signal;
    wherein, the synchronous rectifying control circuit turns the power transistor on when the synchronous rectifying control circuit receives the synchronous signal at the input control terminal, and the synchronous rectifying control circuit turns the power transistor off when the synchronous rectifying control circuit detects that the current flowing through the power transistor is smaller than a pre-determined current by the two detection terminals.

2. The three-pin integrated synchronous rectifier as claimed in claim 1, wherein the detection circuit comprises a first bipolar junction transistor and a second bipolar junction transistor, the bases of the two bipolar junction transistors are connected with each other, the collector of the first bipolar junction transistor and the emitter of the second bipolar junction transistor are coupled with the two detection terminals, the base and the emitter of the first bipolar junction transistor are connected with each other and are coupled with the input control terminal, and the collector of the second bipolar junction transistor is coupled with the delay circuit.

3. The three-pin integrated synchronous rectifier as claimed in claim 1, wherein the delaying circuit is a debouncing circuit.

4. The three-pin integrated synchronous rectifier as claimed in claim 1, wherein the delaying circuit comprises:
    a first transistor coupled with the detection circuit;
    at least one capacitor coupled with the first transistor; and
    a second transistor coupled with the least one capacitor and the driver, wherein the second transistor is in the turn-on status or the turn-off status according to the voltage of the least one capacitor; wherein the first transistor causes the capacitor to be charged or discharged to turn the second transistor off when the turn-off signal is not issued, and to turn the second transistor on to generate the confirm signal when the turn-off signal is issued.

5. The three-pin integrated synchronous rectifier as claimed in claim 1, wherein the delaying circuit further comprises at least one resistor coupling the least one capacitor to a reference voltage, the delaying circuit gradually charges or discharges the capacitor with a second pre-determined period to turn the second transistor off when the second transistor is turned on.

6. A flyback synchronous rectifying circuit, comprising:
    a flyback converter having a first power transistor and a transformer having a primary side and a secondary side, wherein the first power transistor is coupled with the primary side;
    an output capacitor coupled with the secondary side of the transformer;
    a three-pin integrated synchronous rectifier having
        a first electric connection point,
        a second electric connection point;
        a third electric connection point,
        a second power transistor having a first output/input terminal, a second output/input terminal and a control terminal, wherein the first output/input terminal is coupled with the first electric connection point, and the second output/input terminal is coupled with the second electric connection point; and
        a synchronous rectifying control circuit for controlling the electric status of the second power transistor and having an input control terminal, two detection terminals, and an output terminal, wherein the input control terminal is coupled with the third electric connection point, the two detection terminals respectively are coupled with the first output/input terminal and the second output/input terminal of the second power transistor, and the output terminal is coupled with the control terminal of the second power transistor; wherein the synchronous rectifying control circuit comprises:
(i) a detection circuit coupled with the first output/input terminal and the second output/input terminal to form the two detection terminals and used for detecting a current flowing through the second power transistor, wherein the detection circuit outputs a turn-off signal when the current is smaller than the pre-determined current;
(ii) a delay circuit coupled with the detection circuit and outputting a confirm signal when the turn-off signal lasts a first pre-determined period; and
(iii) a driver coupled with the delay circuit and the input control terminal, wherein the driver turns the second power transistor on when the driver receives the synchronous signal at the input control terminal, and the driver turns the power transistor off when the driver receives the confirm signal;
wherein, the synchronous rectifying control circuit turns the power transistor on when the synchronous rectifying control circuit receives a synchronous signal at the input control pin, and the synchronous rectifying control circuit turns the power transistor off when the synchronous rectifying control circuit detects that a current flowing through the power transistor is smaller than a pre-determined current by the two detection pins;
wherein the first electric connection point and the second electric connection point respectively are coupled with the secondary side of the transformer and the output capacitor, and the third electric connection point is used for receiving a synchronous signal;
an output detection unit coupled with the secondary side of the transformer for detecting the electric status of the secondary side to generate an output detection signal;
an electric isolation unit coupled with the output detection unit for outputting the output detection signal with electric isolation, and
a primary PWM controller coupled with the flyback converter and the electric isolation unit for turning on or turning off the first power transistor according to the output detection signal;
wherein, the three-pin integrated synchronous rectifier is turned on for conducting an output current when receiving the synchronous signal, and the three-pin integrated synchronous rectifier is turned off when the output current is smaller than a pre-determined value.

7. The flyback synchronous rectifying circuit as claimed in claim 6, wherein the detection circuit comprises a first bipolar junction transistor and a second bipolar junction transistor, the bases of the two bipolar junction transistors are connected with each other, the collector of the first bipolar junction transistor and the emitter of the second bipolar junction transistor are coupled with the two detection terminals, the base and the emitter of the first bipolar junction transistor are connected with each other and are coupled with the input control terminal, and the collector of the second bipolar junction transistor is coupled with the delay circuit.

8. The flyback synchronous rectifying circuit as claimed in claim 6, wherein the delaying circuit is a debouncing circuit.

9. The flyback synchronous rectifying circuit as claimed in claim 6, wherein the delaying circuit comprises:
a first transistor coupled with the detection circuit;
at least one capacitor coupled with the first transistor; and
a second transistor coupled with the least one capacitor and the driver, wherein the second transistor is in the turn-on status or the turn-off status according to the voltage of the least one capacitor;
wherein the first transistor causes the capacitor to be charged or discharged to turn the second transistor off when the turn-off signal is not issued, and to turn the second transistor on to generate the confirm signal when the turn-off signal is issued.

10. The flyback synchronous rectifying circuit as claimed in claim 6, wherein the delaying circuit further comprises at least one resistor coupling the capacitor to a reference voltage, the delaying circuit gradually charges or discharges the capacitor for a second pre-determined period to turn the second transistor off when the first transistor is in the turn-on status.

11. The flyback synchronous rectifying circuit as claimed in claim 6, wherein the primary side of the transformer has a primary side winding and a primary auxiliary winding, the primary side winding is connected with an input power of the flyback synchronous rectifying circuit and the first power transistor, the primary auxiliary winding is coupled with the primary PWM controller for providing electric power to drive the primary PWM controller.

12. The flyback synchronous rectifying circuit as claimed in claim 6, wherein the secondary side of the transformer has a secondary side winding and a secondary auxiliary winding, the secondary auxiliary winding is coupled with the third electric connection point of the three-pin integrated synchronous rectifier via a diode for generating the synchronous signal according the turn-on/turn-off status of the first power transistor.

13. The flyback synchronous rectifying circuit as claimed in claim 6, wherein the output detection unit is an error amplifier.

14. The flyback synchronous rectifying circuit as claimed in claim 6, wherein the electric isolation unit is a photo coupler.

* * * * *